Dec. 6, 1966   W. L. VANN   3,290,599
POWER MODULATOR FOR TRANSMITTER BEAM SCAN
Filed Dec. 29, 1955   4 Sheets-Sheet 1

INVENTOR
WILLIAM L. VANN

BY
ATTORNEYS

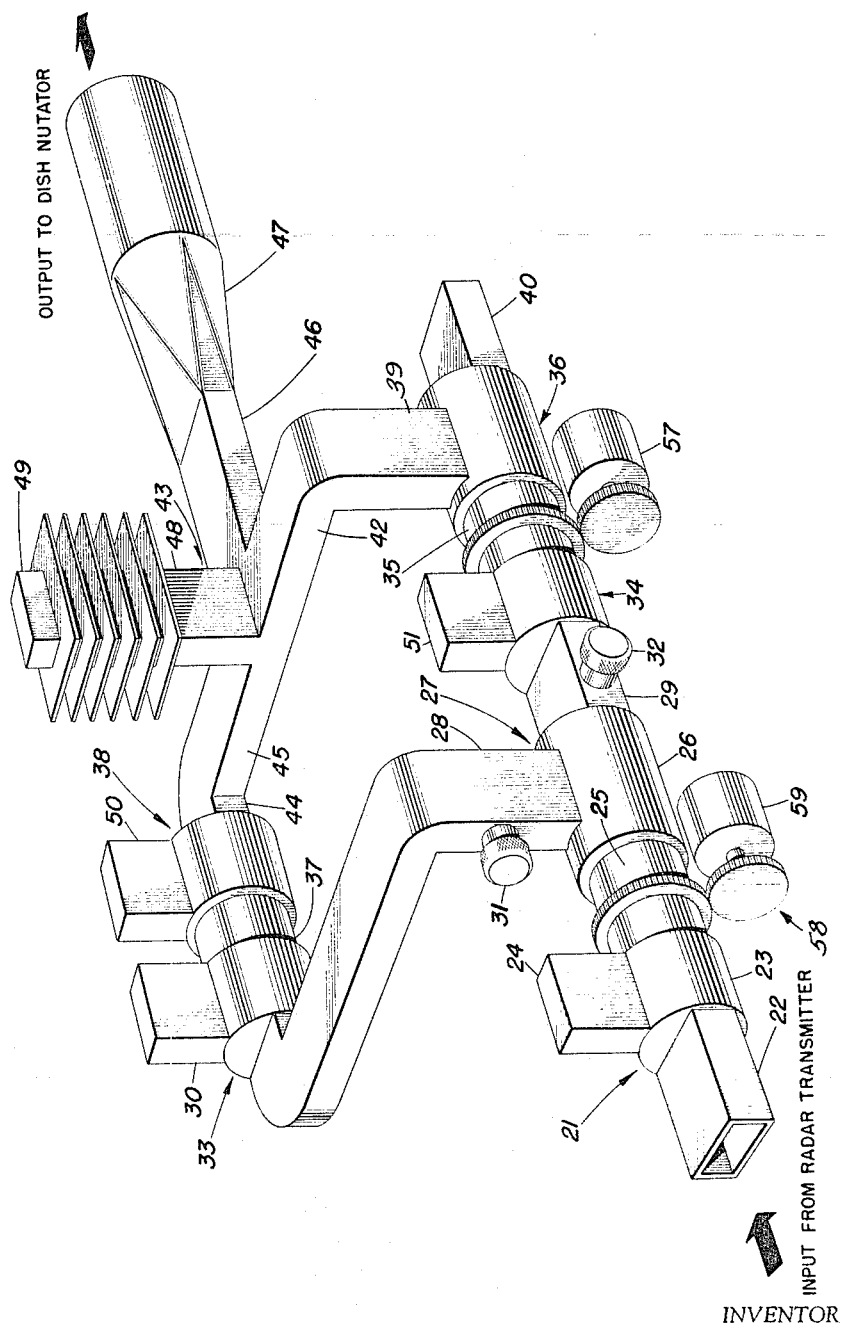

Dec. 6, 1966 W. L. VANN 3,290,599
POWER MODULATOR FOR TRANSMITTER BEAM SCAN
Filed Dec. 29, 1955 4 Sheets-Sheet 3

INVENTOR
WILLIAM L. VANN
BY
ATTORNEYS

United States Patent Office 3,290,599
Patented Dec. 6, 1966

3,290,599
POWER MODULATOR FOR TRANSMITTER BEAM SCAN
William L. Vann, Silver Spring, Md., assignor to the United States of America as represented by the Secretary of the Navy
Filed Dec. 29, 1955, Ser. No. 556,370
8 Claims. (Cl. 325—178)

The present invention relates to power modulators. More particularly, it relates to apparatus for modulating the power transmitted by a conical scan radar transmitter to provide improved low angle guidance for beam riding missiles.

Beam riding guided missiles are an effective naval weapon for the reason that the missile is under the complete control of the guidance apparatus located at the launching site. The missiles can thus be steered to intercept maneuvering targets, and therefore possess greater lethality than the most accurate gunfire. Further, beam riding missiles are preferred over command guidance missiles for naval use since command systems rely on triangulation to compute the required missile trajectory. A method of guidance based on triangulation is unsuited for naval warfare, as it is usually necessary to maintain a fixed baseline of some length. Normally such a baseline is best established between two ships, but even under the most favorable conditions ships have difficulty maintaining a precise station.

On the other hand, beam riders employ a single tracking and guidance radar beam. The missile is implemented to steer itself onto the axis of the radar beam and to maintain that position until proximity to the target detonates the missile warhead. The missile can therefore be launched and steered by a single ship, but since the missile's guidance information is derived entirely from the radar beam, the missile must find the beam early in its trajectory or risk the possibility of falling uselessly into the sea.

Missile flight is accomplished in two stages. In the first, or boost stage, the missile is accelerated to supersonic cruising speed along a ballistic trajectory. In the second, or sustaining stage, the missile maintains cruising speed along a guided trajectory. Guidance is generally not attempted during boost for the reason that missile controls designed for high speeds are inefficient at low speed. The missiles are therefore launched along a trajectory which is, under ideal circumstances, initially aligned with the tracking radar beam. At the end of the boost phase the missile is traveling at supersonic speed within the tracking radar beam. The missile flight may then be controled in an efficient manner.

Actually, the missile can seldom be relied upon to maintain its initial course. Rather, at the end of the boost phase, the missile may be dispersed anywhere within ±5 degrees of the tracking beam.

Dispersion of the missiles at the end of boost complicates the beam rider method of guidance. In order that the tracking radar may be reasonably accurate, the guidance beam must be made as narrow as possible, and at present is approximately 1 degree in width. Such a narrow beam requires the use of an auxiliary capture beam at least as wide as the probable missile dispersion, otherwise a very large percentage of the missiles will never be brought under control at the end of boost. Also, a minimum launching elevation is imposed by dispersion which cannot be less than the dispersion angle. If this limitation is violated a large percentage of missiles will strike the sea surface before control can be accomplished.

It is appropriate to consider the aspects of low flying targets. A target at 10,000 yards range and an altitude of 500 feet represents an elevation above the horizon of approximately 1 degree. The radar cannot effectively track below this elevation because of reflections from the sea. But even assuming effective tracking at or below a 1 degree elevation, as the wide capture beam is depressed into alignment wtih the tracking beam, a substantial portion of the capture beam illuminates the surface of the sea. The missile looking back into capture beam for guidance information will therefore see not only the true capture beam source, but also a virtual image of the capture beam source below the sea surface. The missile may be incapable of distinguishing between the true and the virtual signal and therefore fail to reach the tracking beam axis.

Accordingly, it is an object of the present invention to provide the means for improving the capture of missiles at low elevations.

Another object of the present invention is to provide the means for power modulating a nutating radar beam.

A further object of the present invention is to provide power variation in a conical scan radar beam synchronized with the beam scanning, to permit the depression of the beam axis close to a reflecting surface without adverse effects.

An additional object of the present invention is to provide a conical scan radar having asymmetric upper and lower beam lobes.

Still another object of the present invention is to provide power modulation to enable improved tracking and target resolution to be obtained from conical scan radars.

Other objects and many of the attendant advantages of this invention will be readily appreciated as the same becomes better understood when considered in connection with the accompanying drawings, in which:

FIG. 4 is a perspective view of the apparatus for accomplishing power modulation;

Figure 1:
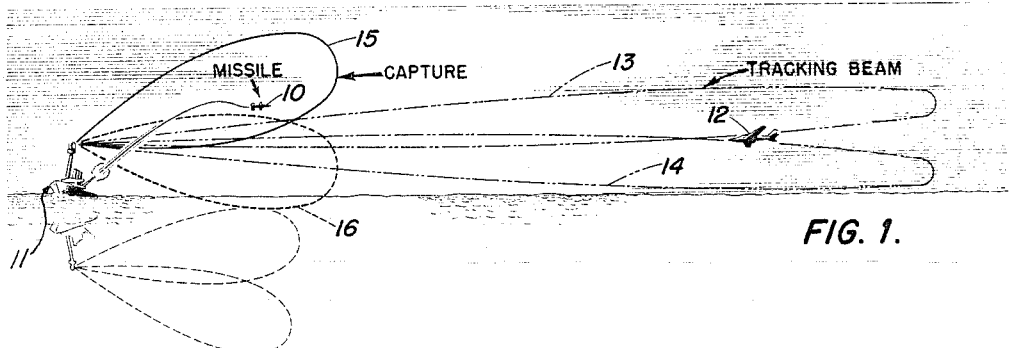
FIG. 1 is a pictorial representation of a missile launched from a ship against a low flying target and of the virtual image of the ship created by reflections from the sea surface.

In FIG. 1, a beam riding missile 10 is illustrated as being launched from a ship 11 against a low flying target 12. A conical scanning tracking and guidance radar mounted aboard the ship generates a beam of energy, the outlines of which are shown in the up position at 13 and the down position at 14. The locus of equal power points between the lobes 13 and 14 is the guidance axis of the radar.

Prior to the present invention, a broad symmetrical capture beam was employed to bring the missile 10 into alignment with the guidance axis. The capture beam appears in its upper position at 15 and is shown in its lower position by the dotted line at 16. The capture beam illuminates a substantial portion of the sea surface and thus gives rise to false guidance signals.

Figure 2:
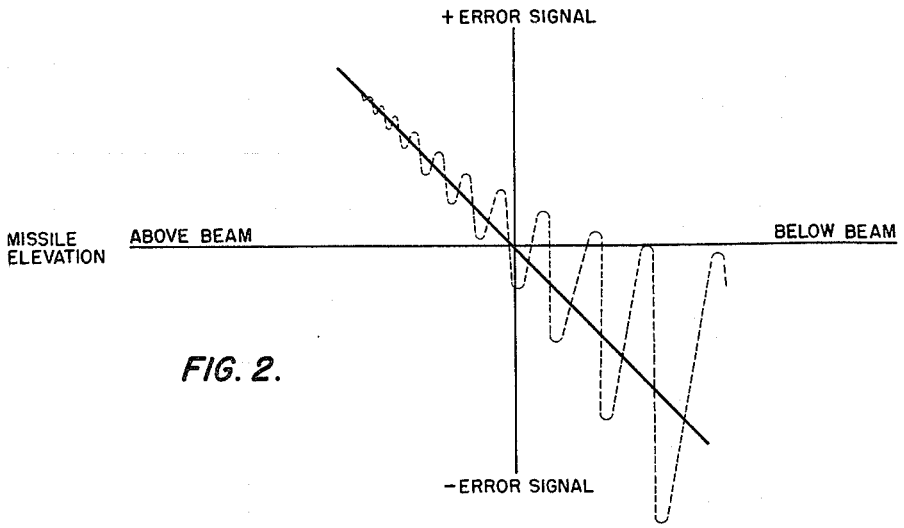
FIG. 2 is a chart indicating the error signal received by the missile in free space, and in the presence of interfering reflections from the sea surface.

The character of missile error signals in the presence of interfering reflected signals is illustrated in FIG. 2. The error signal, provided by demodulating the signals received by the missile, indicates by its magnitude the distance from the beam center and by its polarity the direction of the beam center. The received signal comprises the sum of the direct and reflected signal. The signal received by the missile in free space, that is, in the absence of interfering signals, produces the smooth error signal shown by the solid line. When a reflecting surface is present however, the missile receives a signal directly from the radar, which in general is the stronger ray, and a reflected signal, which, except for low elevation angles, is the weaker signal. Because the path length of the reflected signal is longer than that of the direct signal, phase differences exist between the direct and reflected signals. Therefore, as the missile elevation angle is varied, the signal at the missile exhibits a series of maxima and minima. The effect upon the error signal of the variations in the received signal introduced by interference is shown in the dotted line of FIG. 2.

It will be seen that so long as the missile is well above the beam, interference has little effect on the error signal and therefore the missile will respond in the proper direction to bring itself toward the beam center. As the missile approaches the beam center, however, the interference has a disruptive effect on the sense of the error signal. Moreover, where the error signal possesses a slope opposite to that of the free space error signal, the missile tends to be driven into instability.

In accordance with the present invention, the deleterious effects of interference are substantially reduced by power modulating the scanning beam. The power of the radiated beam is varied in fixed phase with respect to the scan cycle, the phasing being such that maximum power is transmitted when the beam is in the up position and minimum power is transmitted in the lower position.

Modulation in this manner has the effect of lowering the electrical scan axis of the radar without a physical displacement of the antenna. The particular advantage to be obtained thereby is improved low angle operation of the radar. With power modulation, the antenna axis may be tilted upwards so that rays striking the reflecting surface must originate from a lower power portion of the beam and therefore the difference between the maxima and minima of the interference pattern is substantially reduced.

Figure 3:
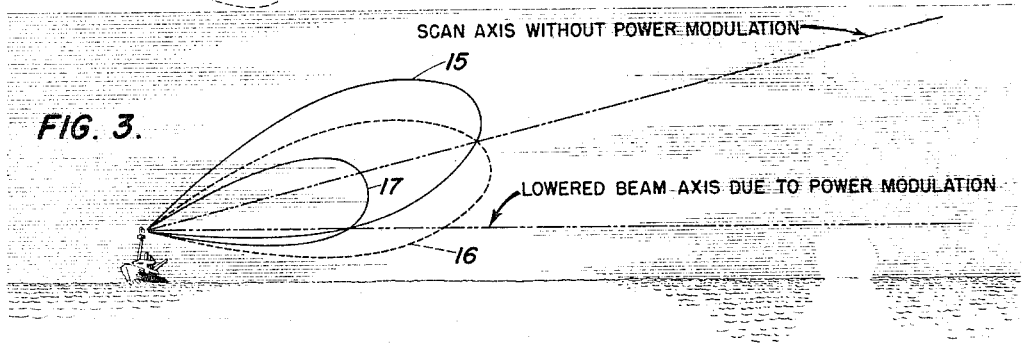
FIG. 3 illustrates, by polar plots of the antenna pattern, the lowered beam axis enabled by power modulation.

In FIG. 3, polar plots of the antenna pattern illustrate the operation of power modulation. The beam 15 in the upper position represents the maximum transmitted power. The beam 17 in the lower position represents minimum transmitted power due to power modulation of the beam. As will be seen the crossover point, that is the point where the upper and lower beams intersect, is substantially lowered by the presence of power modulation.

In FIG. 4, the apparatus for accomplishing power modulation is illustrated. Input power from the radar magnetron (not shown) is applied to a conventional circular waveguide magic T 21. The magic T 21 comprises a rectangular input waveguide section 22, a round waveguide section 23 having its longitudinal axis aligned with the longitudinal axis of waveguide 22, and a second rectangular waveguide section 24 arranged to intersect the circular waveguide section 23 such that the wide dimension of waveguide section 24 runs parallel to the longitudinal axis of waveguide section 22.

Details of the construction of suitable round waveguide magic T's are available in the literature, for example at page 369 of "Microwave Duplexers" by Smullin and Montgomery, volume 14 of the Massachusetts Institute of Technology Radiation Laboratory series.

The energy contained in round waveguide 23 is passed through a polarization rotator 25 which comprises a rotatable section of round waveguide having a half wave plate of dielectric material inserted therein.

Energy from the polarization rotator 25 is fed into the round waveguide section 26 of a magic T 27 similar to magic T 23.

Energy within waveguide section 26 is proportioned between the two rectangular waveguide arms 28 and 29 of magic T 27 according to the rotational position of the half wave plate within polarization rotator 25. Phase shifters 31 and 32 are provided in each of the rectangular arms 28 and 29 so that subsequent differences in path length may be equalized. Each of the rectangular arms 28 and 29, respectively, terminates in magic T's 33 and 34, which are similar to magic T 23. Energy transmitted through the round waveguide section of magic T 34 passes through a second polarization rotator 35, similar to polarization rotator 25, and thence into a round magic T 36. Energy transmitted through the round waveguide section of magic T 33 passes through a round waveguide section 37 containing a fixed half wave plate and thence into a round magic T 38.

The signal in waveguide 28 passes into magic T 43, without alteration in phase or amplitude. Magic T's 33 and 38 and half wave plate section 37 are provided in order that the transmission characteristics of the line through waveguide 28 into magic T 43 will closely match those of the line through waveguide 29 into magic T 43.

One rectangular arm 39 of magic T 36 is connected to an input arm 42 of a conventional rectangular magic T 43. One rectangular arm 44 of magic T 38 is connected to an input arm 45 opposite arm 42 of magic T 43. The H plane arm 46 is joined to the radar nutating means and antenna through a tapered rectangular to round waveguide transition section 47. The E plane T arm 48 is terminated in a power absorbing load 49. The rectangular arms 24, 30, 40, 50, and 51 of the various round magic T's are not employed for the transmission of energy and are each terminated in power absorptive loads, which may consist of a card of resistance material inserted therein.

Figure 5:
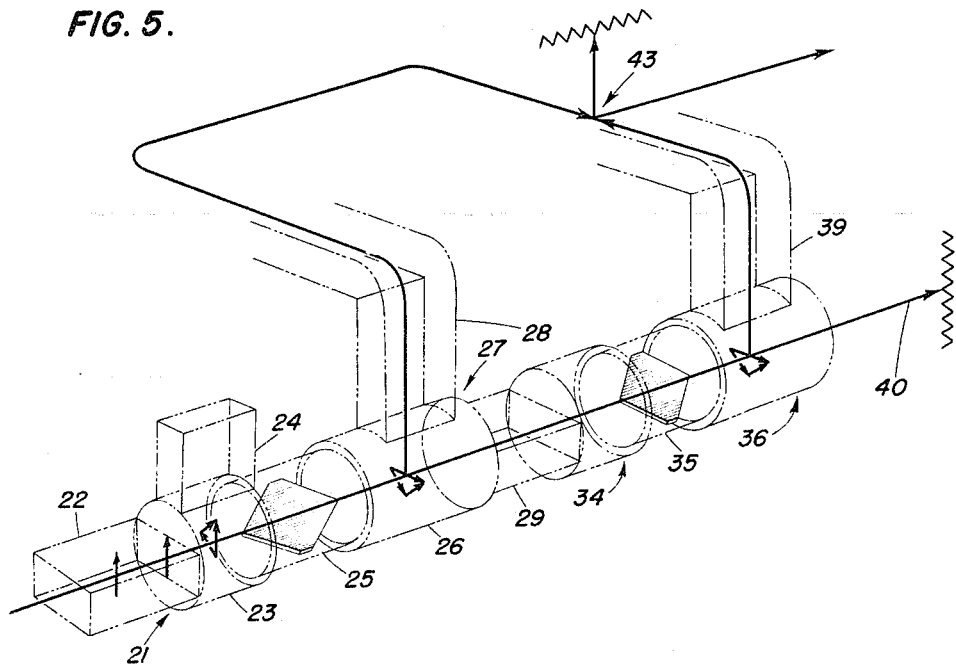
FIG. 5 is a phantom view of portions of the apparatus of FIG. 4 illustrating the operation of the present invention.

In FIG. 5 certain of the elements appearing in FIG. 4 are shown in phantom view to aid in the explanation of power flow through the modulator. The remaining elements of FIG. 4, provided for matching purposes, are entirely omitted from FIG. 5, while the power absorptive loads and magic T 43 are schematically represented.

Power admitted to waveguide 22 passes without change of polarization into the round waveguide 23. Waveguide 24 is incapable of supporting waves polarized in the same plane as those contained within waveguide 22, and hence no power enters waveguide 24. Resolving the vertical electric vector of the waves in waveguide 23 into the two components at 45° to the vertical and assuming the half wave plate to be aligned with one of the components, it will be seen that after passing the half wave plate, the plane of polarization of the waves has been rotated through 90° to become horizontally polarized. All of the power transmitted by the horizontally polarized waves will enter the rectangular waveguide 28 and no power enters waveguide 29 because the latter is incapable of supporting waves horizontally polarized.

Since the electric vector in waveguide 25 may be resolved into any components desired, it can be stated generally that the signal will be divided between waveguides 28 and 29 as follows:

The signal appearing in waveguide 28 will be $$e_{28} = E \cos 2\theta \cos w_1 t \tag{1}$$

and the signal appearing in waveguide 29 will be $$e_{29} = E \sin 2\theta \cos w_1 t \tag{2}$$

In Equations 1 and 2 above, $E \cos w_1 t$ represents the signal in waveguide 25 and $\theta$ is the angular deviation of the half wave plate from 45° to the vertical. The combination of polarization rotator 25 and round magic T 27 thus provides a power divider by means of which power may be proportioned as desired between waveguides 28 and 29.

The signal proceeding through waveguide 29 and into magic T 34 is similarly divided by polarization rotator 35 and magic T 36 between waveguides 39 and 40 so that the signal in waveguide 39 becomes $$e_{39} = E \sin 2\theta \cos 2w_2 t \cos w_1 t \quad (3)$$

where $w_2$ is the rotational frequency of the polarization rotator 35. The signal in waveguide 40 is dissipated in a load and need not be given further consideration.

Magic T 43 combines the signals applied to arms 42 and 45 such that the power carried by each of the input arms is added in arm 46 and subtracted in arm 48. In order that magic T 43 will function as desired, the phase of the signals in arms 42 and 45 must be in phase during one half of the modulation cycle and 180° out of phase during the remaining half cycle. Proper phase is obtained by adjusting phase shifters 31 and 32.

By introducing the factor $1\sqrt{2}$, the sum of Equations 1 and 3 serves to represent the output signal in arm 46 contributed by arms 42 and 43. Therefore $$e_{46} = \frac{E}{\sqrt{2}} \cos 2\theta \cos w_1 t + \frac{E}{\sqrt{2}} \sin 2\theta \cos 2w_2 t \cos w_1 t \quad (4)$$

The difference power in arm 48 in dissipated in load 49 and need not be further considered. For convenience Equation 4 may be rearranged as follows;

$$e_{46} = \frac{E}{2} \cos 2\theta (1 + \tan 2\theta \cos 2w_2 t) \cos w_1 t \quad (5)$$

Equation 5 illustrates that the index of modulation $m$ of the output is $\tan 2\theta$, varied by adjustment of polarization rotator 25, while the amplitude of the electric field varies as $\cos 2\theta$ and is also a function of the position of polarization rotator 25. The average power output of the radar is found by squaring Equation 5 dividing by the characteristic impedance $Z_0$, and integrating between the limits of $w_1=0$ and $2\pi$. Hence, the average power $P$ is $$P = \frac{E^2}{4Z_0} \cos^2 2\theta \left[ 1 + 2\tan 2\theta \cos 2w_2 t + \frac{\tan^2 2\theta}{2}(1 + \cos 4w_2 t) \right] \quad (6)$$

It is desired to modulate the power as a function of the radar scan angle. It is necessary therefore to fix the rotational frequency of polarization rotator 34 at half the radar scan frequency. Substituting $w_s/2$ for $w_2$ in Equation 6 there results $$P = \frac{E^2}{4Z_0} \cos^2 2\theta \left[ 1 + 2\tan 2\theta \cos w_s t + \frac{\tan^2 2\theta}{2}(1 + \cos 2w_s t) \right] \quad (7)$$

Equation 7 indicates that a certain amount of radiated power goes into the production of a component varying at twice the modulation frequency.

Figure 6:
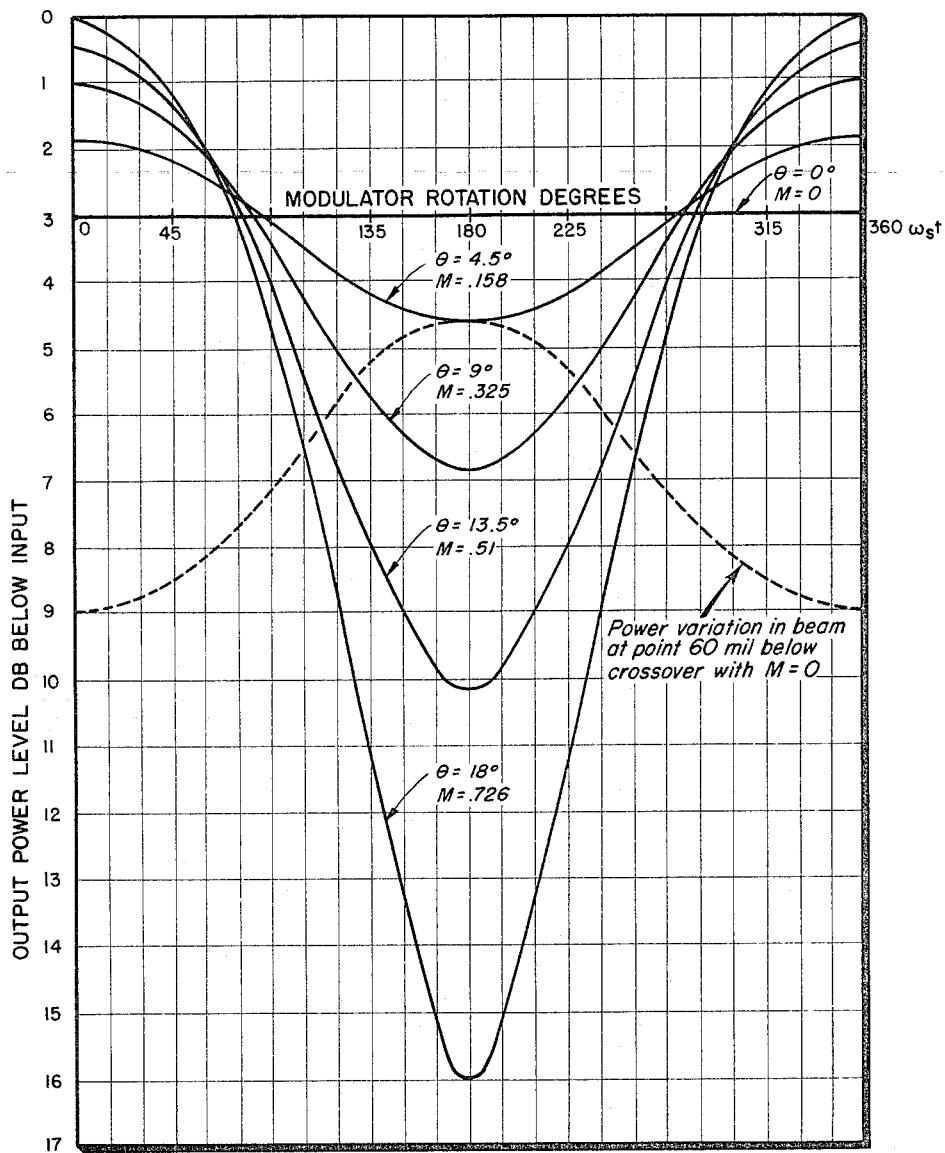
FIG. 6 is a chart illustrating the power modulation in a radar beam during one scan cycle for various indices of modulation.

In FIG. 6, Equation 7 has been plotted through one scan cycle for various values of $m$. The angular rotation in electrical degrees of polarization rotator 35 is plotted as the abscissa, while the family of curves is obtained by varying the parameter $\theta$, i.e. the position of polarization rotator 25 in degrees. Characteristically, no power variation is observed at the radar crossover axis. Therefore, if it is desired to depress the crossover by a specified amount, the modulation index $m$ necessary to achieve that depression can be determined with the aid of FIG. 6. For example, the dotted line curve represents the power variation in an unmodulated beam due to nutation, or scan, at a point located 60 mils below crossover. If crossover is to be depressed 60 mils, it is necessary that this variation be eliminated. The required value of $m$ is that producing a variation which, when added to the variation due to nutation, produces a constant power level. An appropriate value of $m$ would therefore be somewhat less than .325. Since the example was chosen merely to illustrate the operation of power modulation, it should be noted that no attempt has been made to select the precise value of $m$ required to depress the crossover 60 mils. As $m$ is fully variable in the required region, obviously a value exists which will satisfy the requirement of no power variation on the crossover axis.

Figure 7:
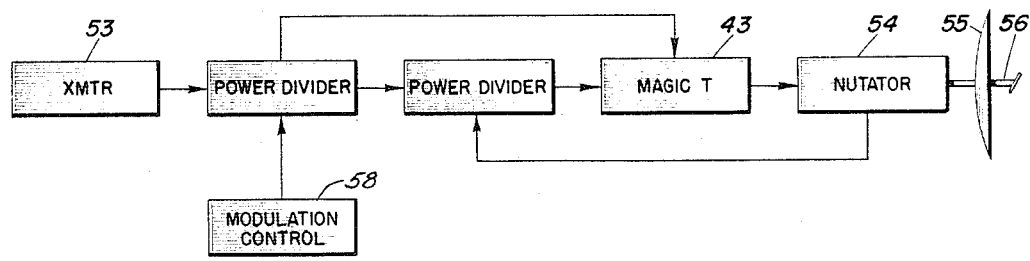
FIG. 7 is a block diagram of the power modulator of the present invention showing the interconnection of the modulator with a radar antenna and nutating mechanism.

In the block diagram of FIG. 7, the power modulator is shown integrated with the radar transmitter 53 and nutating mechanism 54. The nutator 54 and antenna may be of any conventional type, for example the antenna may comprise a dish 55 provided with an eccentric feed 56 which is rotated by a nutator motor to achieve conical scan. The nutation motion is coupled by any suitable means to polarization rotator 35 with a speed reduction of one-half, as for example a synchro 57 (FIG. 4). The modulation index $m$ can be altered by means of a modulation control 58 comprising polarization rotator 25 (FIG. 4) together with suitable rotating means, as for example, a synchro 59 (FIG. 4) which enables variation of the modulation index from a remote location. Thus the power modulation maintains a fixed phase relation with the radar scan while the depression of the crossover axis is variable as desired. The missile may be launched into an elevated unmodulated capture beam, and without changing the position of the radar antenna, the captured missile may be lowered into alignment with the guidance beam by increasing the modulation index $m$ through variation of the modulation control.

Obviously many modifications and variations of the present invention are possible in the light of the above teachings. It is therefore to be understood that within the scope of the appended claims the invention may be practiced otherwise than as specifically described.

What is claimed is:

1. A power modulator comprising, a source of electromagnetic energy, a pair of separate paths in shunt for conducting energy from said source, means for combining the energy conducted by said separate paths, an antenna receiving the output of said combining means for radiating the combined energy, a junction in one of said paths, said junction including a load for absorbing energy and a path for transmitting energy, means in said one of said paths for proportioning the energy in said one of said paths between said load of said junction and said transmission path of said junction, and means for dividing the energy flowing from said source between said separate paths.

2. A power modulator for a radar, comprising, a power divider receiving the output power of the radar, a pair of separate transmission paths, said power divider dividing the radar output power between said paths, a second power divider in one of said paths, a load in said one of said paths, said second power divider diverting a portion of the power in said one path to said load, means for combining the power transmitted through said separate paths, and an antenna receiving the output of said combining means and radiating the output as the output signal from said radar.

3. A power modulator for a conical scan radar, comprising, a transmission path for conducting power between the source of electromagnetic power of said radar and the antenna of said radar, means in said transmission path for diverting a portion of the energy therefrom and means for synchronizing said last named means with the cyclic conical scan operation of said radar, whereby the power radiated by the antenna of said radar varies in fixed phase relationship with the scan cycle of the radar.

4. A power modulator for a conical scan radar, comprising, a transmission path for conducting power from the source of electromagnetic energy to the antenna of the radar, a variable power divider in said path for diverting power therefrom in variable amounts, means for nutating the beam of energy radiated by the antenna of said radar to generate a scan cycle, and means coupling said nutating means with said variable power divider in fixed phase relationship whereby minimum power is transmitted through said path at a fixed position in each scan cycle.

5. A power modulator for a radar emitting a nutating beam of electromagnetic energy, comprising, a pair of separate transmission paths for conducting power from the source of electromagnetic energy within said radar to the radar antenna, means for proportioning power between said separate paths, means in one of said separate paths for diverting a portion of the energy therefrom, means for nutating the beam of energy radiated by the radar antenna, and means for synchronizing said diverting means with said nutating means, whereby the power output of the radar antenna is modulated as a function of the nutation of the radar beam.

6. A power modulator for a conical scan radar, comprising, a rotatable section of round waveguide, a half wave plate in said rotatable section, means for admitting power into said rotatable section, a round waveguide magic T including a pair of rectangular waveguide arms and a length of round waveguide, said rectangular arms being arranged to intersect said length of round waveguide, said length of round waveguide receiving the power flow through said rotatable section, said rotatable waveguide proportioning the power in said length of round waveguide between said rectangular arms according to the rotary position thereof, means for cyclically diverting power from one of said rectangular waveguide arms, means for combining the power flow through the other of said rectangular waveguide arms with the undiverted power in said one rectangular waveguide arm, and means in said other arm for equalizing the phase of the power signals in said combining means.

7. A power modulator as claimed in claim 6, wherein said means for cyclically diverting power from one of said rectangular waveguides comprises a second rotatable section of round waveguide, a second half-wave plate in said second rotatable section, means admitting the power in said one rectangular waveguide arm into said second rotatable round waveguide section, and a second round waveguide magic T including a second pair of rectangular waveguide arms and a second length of round waveguide, said second length of round waveguide receiving the power flow through said second rotatable waveguide section, one of said second pair of rectangular waveguide arms being connected to said combining means.

8. A power modulator as claimed in claim 6, wherein said means for combining the power flow comprises a rectangular waveguide magic T, said rectangular waveguide magic T including a pair of intersecting rectangular waveguide input arms, one of said input arms receiving the power flow through said other rectangular waveguide arm of said round waveguide magic T, the other of said input arms receiving the undiverted power flow through said one rectangular waveguide arm of said round magic T, a third rectangular waveguide lying in the E plane of said input arms and intersecting said arms at the junction thereof, and a fourth rectangular waveguide lying in the H plane of said input arms and intersecting said arms at the junction thereof, said fourth rectangular waveguide constituting the output path of the modulator.

No references cited.

DAVID G. REDINBAUGH, *Primary Examiner.*

CHESTER L. JUSTUS, *Examiner.*

J. W. CALDWELL, *Assistant Examiner.*